US009908412B2

(12) United States Patent
Ishikawa et al.

(10) Patent No.: US 9,908,412 B2
(45) Date of Patent: Mar. 6, 2018

(54) ON-VEHICLE METER AND DISPLAY APPARATUS

(71) Applicant: Japan Display Inc., Tokyo (JP)

(72) Inventors: Makoto Ishikawa, Tokyo (JP); Shinichiro Tanaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/709,704

(22) Filed: May 12, 2015

(65) Prior Publication Data

US 2015/0328989 A1 Nov. 19, 2015

(30) Foreign Application Priority Data

May 13, 2014 (JP) .................. 2014-099920

(51) Int. Cl.
| B60Q 1/00 | (2006.01) |
| B60K 35/00 | (2006.01) |
| F21V 8/00 | (2006.01) |
| B60K 37/02 | (2006.01) |

(52) U.S. Cl.
CPC .............. *B60K 35/00* (2013.01); *B60K 37/02* (2013.01); *G02B 6/0066* (2013.01); *B60K 2350/1064* (2013.01); *B60K 2350/203* (2013.01); *B60K 2350/206* (2013.01); *B60K 2350/2017* (2013.01); *B60K 2350/2056* (2013.01)

(58) Field of Classification Search
None
See application file for complete search history.

(56) References Cited

U.S. PATENT DOCUMENTS

| 6,152,066 A * | 11/2000 | Knoll ..................... B60K 35/00 116/286 |
| 6,621,471 B1 * | 9/2003 | Ozaki .................... B60K 35/00 345/4 |
| 2009/0179840 A1 * | 7/2009 | Tanaka .............. G02F 1/133305 345/87 |
| 2011/0013123 A1 * | 1/2011 | Park .................... G02B 6/0036 349/96 |
| 2011/0063542 A1 * | 3/2011 | Park .................... G02B 6/0036 349/62 |
| 2015/0015807 A1 * | 1/2015 | Franke ................. B32B 17/064 349/12 |
| 2015/0226988 A1 * | 8/2015 | Chen .................... G02F 1/1334 349/12 |
| 2015/0268465 A1 * | 9/2015 | Nagata ................. G06F 3/1423 345/1.1 |

FOREIGN PATENT DOCUMENTS

JP 2006-065031 3/2006

* cited by examiner

*Primary Examiner* — Brian Zimmerman
*Assistant Examiner* — Kevin Lau
(74) *Attorney, Agent, or Firm* — K&L Gates LLP

(57) ABSTRACT

An on-vehicle meter includes a meter including an indicator that rotates about a certain axis, a transparent display device provided on a display side of the meter, a light guide plate provided between the meter and the transparent display device, a light source that emits light to the light guide plate, and a control device that controls a display state of the transparent display device and the light source.

2 Claims, 7 Drawing Sheets

FIG.6
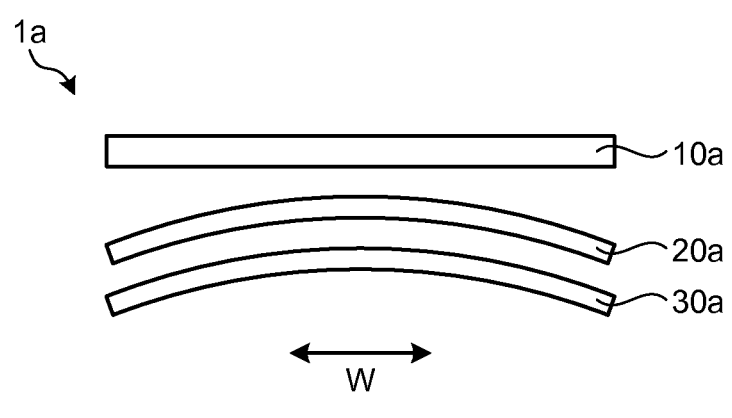

ON-VEHICLE METER AND DISPLAY APPARATUS

CROSS REFERENCES TO RELATED APPLICATIONS

The present application claims priority to Japanese Priority Patent Application JP 2014-099920 filed in the Japan Patent Office on May 13, 2014, the entire content of which is hereby incorporated by reference.

BACKGROUND

1. Technical Field

The present invention relates to an on-vehicle meter and a display apparatus which are provided with a transparent display device.

2. Description of the Related Art

Transparent display devices themselves have a certain degree of transparency. Thus, the transparent display devices are applied to windows of buildings and vehicles, show windows of stores, or the like, so that they can not only provide such an essential display function as providing an advertisement and information but also be excellent in design characteristics (see Patent Literature 1: Japanese Patent Application Laid-open Publication No. 2006-65031 for reference).

With the object of improving the high grade impression for an on-vehicle meter provided with a speedometer, a tachometer, a fuel gauge, a water-temperature gauge or the like, an on-vehicle meter has been recently proposed to include a transparent display device on a front surface of a meter including an indicator. In a case that a display device disclosed in the Patent Literature 1 is arranged at a front surface of an on-vehicle meter, the background of the display device is always seen through the display device, thus reducing visibility of the meter may be reduced.

SUMMARY

According to an aspect of the present invention, there is provided an on-vehicle meter including: a meter including an indicator that rotates about a certain axis; a transparent display device provided on a display side of the meter; a light guide plate provided between the meter and the transparent display device; a light source that emits light to the light guide plate; and a control device that controls a display state of the transparent display device and the light source.

According to another aspect of the present invention, there is provided a display apparatus including: a meter including an indicator that rotates about a certain axis; a transparent display device provided on a display side of the meter; a light guide plate provided between the meter and the transparent display device; a light source that emits light to the light guide plate; and a control device that executes a first display mode in which the light source is turned off and the transparent display device is set in a non-display state, and a second display mode in which the light source is turned on and an image is displayed on the transparent display device.

Additional features and advantages are described herein, and will be apparent from the following Detailed Description and the figures.

BRIEF DESCRIPTION OF THE FIGURES

FIG. 6 is a top view illustrating an on-vehicle meter which is a display apparatus according to a first modification of the embodiment.

DETAILED DESCRIPTION

Figure 1:
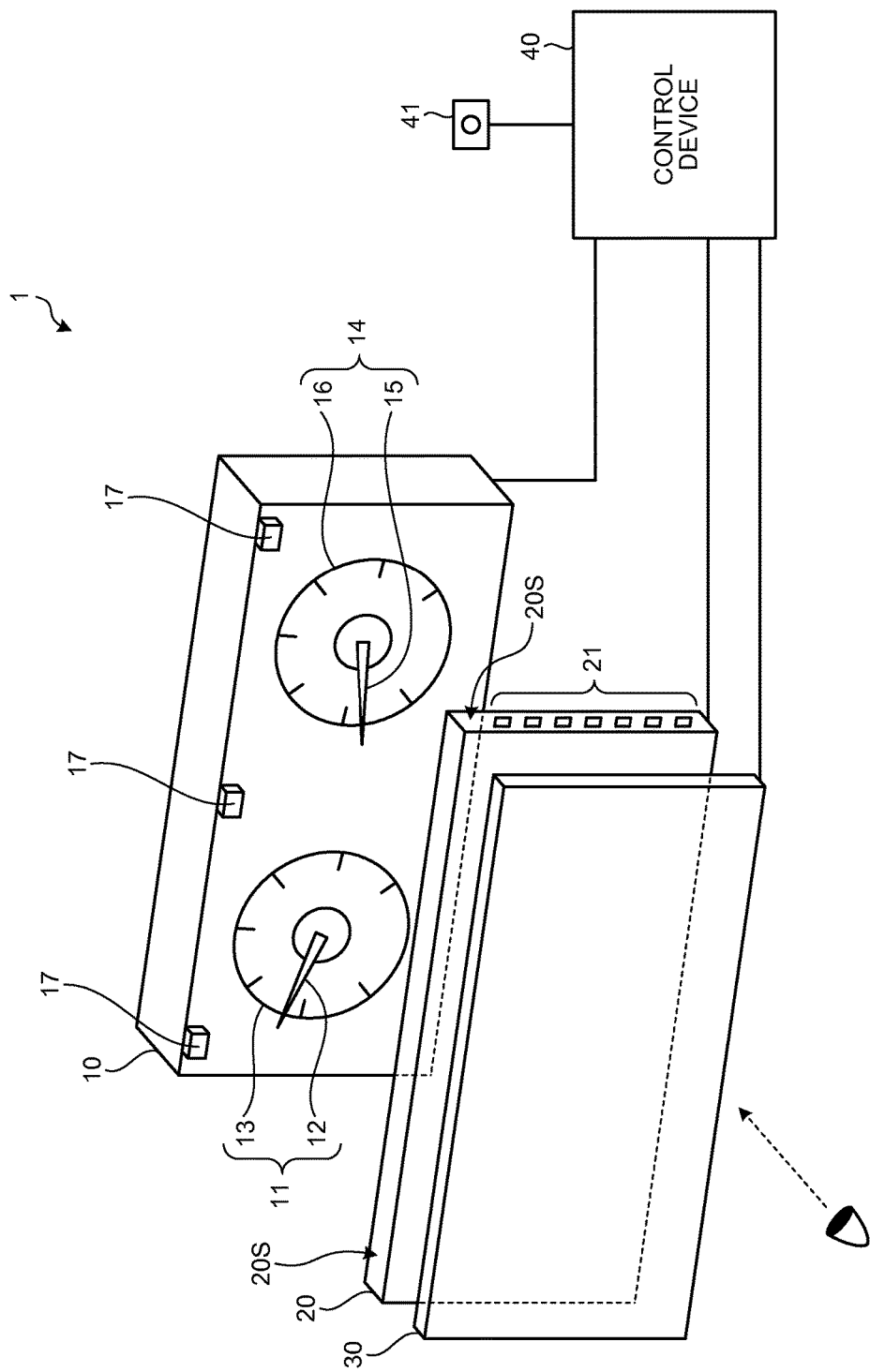
FIG. 1 is a perspective view illustrating an on-vehicle meter which is a display apparatus according to an embodiment.

The following describes an embodiment of the present disclosure with reference to the drawings. The present disclosure is exemplary only, and naturally encompasses appropriate modifications easily conceivable by those skilled in the art while maintaining the gist of the present disclosure. To clarify the description, a width, a thickness, a shape, and the like of each component may be schematically represented in the drawings as compared with actual aspects, but they are merely an example. Interpretation of the present disclosure is not limited thereto. The same elements as those previously described with reference to the previous drawings are denoted by the same reference numerals in the present disclosure and respective drawings, and detailed description thereof will not be repeated in some cases.

Figure 2:
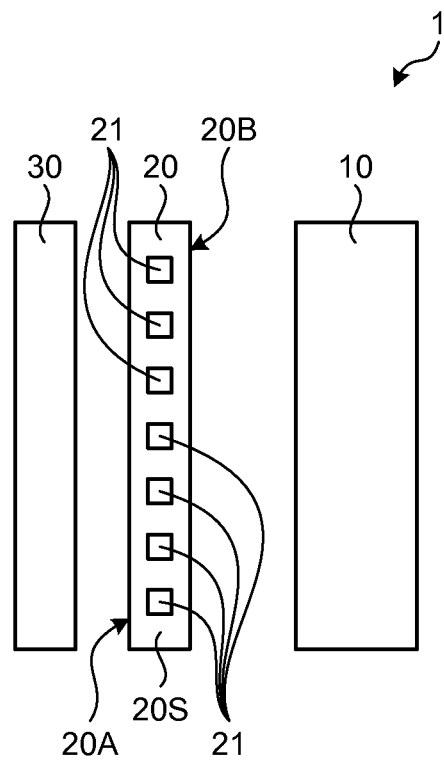
FIG. 2 is a side view of the on-vehicle meter which is the display apparatus according to the embodiment.

FIG. 1 is a perspective view illustrating an on-vehicle meter which is a display apparatus according to an embodiment. FIG. 2 is a side view of the on-vehicle meter which is the display apparatus according to the embodiment. A display apparatus 1, that is, an on-vehicle meter 1 is a device that is mounted on such a vehicle as a car, a bus, a truck or a railway vehicle. The on-vehicle meter 1 shows such information as a traveling speed of the vehicle or a rotational speed of an engine mounted on the vehicle. The on-vehicle meter 1 includes a meter unit 10, a transparent display device 30, a light guide plate 20, light sources 21, and a control device 40. Information showed by the on-vehicle meter 1, which is not limited to those described above, is dependent on the kind and specification of the vehicle on which the on-vehicle meter 1 is mounted.

The meter unit 10 includes a first meter 11 and a second meter 14. In this embodiment, the meter unit 10 further includes light sources (hereinafter, referred to as meter light sources) 17. The first meter 11 includes an indicator 12 and graduations 13. The second meter 14 includes an indicator 15 and graduations 16. The indicator 12 of the first meter 11 rotates about a certain axis. The graduations 13 of the first meter 11 are provided around the certain axis about which the indicator 12 rotates. The indicator 15 of the second meter 14 rotates about a certain axis. The graduations 16 of the second meter 14 are provided around the certain axis about which the indicator 15 rotates.

The first meter 11 is, for example, a tachometer indicating a rotational speed of an engine mounted on the vehicle. The second meter 14 is, for example, a speedometer indicating a traveling speed of the vehicle. In this embodiment, the meter unit 10 may include at least one of the first meter 11 and the second meter 14. The meter unit 10 may further includes a distance meter, a fuel gauge, a water-temperature gauge, a clock or the like.

The meter light sources 17 are provided above the first meter 11 and the second meter 14. The meter light sources 17 are turned on in such a case that the meter unit 10 alone is visually recognized. In this embodiment, the meter light sources 17 are not limited to be positioned above the first meter 11 and the second meter 14, and may be positioned below or around of the first meter 11 and the second meter 14. The meter unit 10 may not be provided with the meter light sources for a meter 17.

The transparent display device 30 itself has a certain degree of transparency, and a background of a screen is seen through the transparent display device 30. In this embodiment, the transparent display device 30 is, for example, a liquid crystal display panel. The transparent display device 30 may display a color image or a monochrome image. In this embodiment, the transparent display device 30 is a fringe field switching (FFS) type, but not limited thereto. Such liquid crystals having an in-plane switching (IPS) type, a twisted nematic (TN) type, an optically compensated bend (OCB) type, an electrically controlled birefringence (ECB) type may be utilized for the transparent display device 30.

The transparent display device 30 is, but is not limited to, a normally black type in which light is not transmitted and black display is obtained, that is, a non-display state is obtained when no voltage is applied. For example, the transparent display device 30 may be a normally white type in which light is transmitted and white display is obtained, that is, a display state is obtained when no voltage is applied. The transparent display device 30 is provided on a display side of the meter unit 10, that is, a side on which the indicators 12 and 15 are provided.

The light guide plate 20 is provided between the meter unit 10 and the transparent display device 30. The light guide plate 20 includes a surface 20B facing the meter unit 10, a surface 20A facing the transparent display device 30, and side surfaces 20S coupling the surface 20A to the surface 20B. The side surfaces 20S surround peripheries of the surfaces 20A and 20B. The light guide plate 20 is made of, for example, transparent resin or transparent glass. Fine projections and depressions are formed on the surface 20B facing the meter unit 10 of the light guide plate 20. The projections and depressions may be formed on the surface 20B using, for example, a nano-imprint process.

In this embodiment, the shape of the light guide plate 20 has a rectangle shape(including a square shape) when viewed from a direction orthogonal to an in-plane direction of the surface 20A or the surface 20B. As illustrated in FIG. 1, the light sources 21 are provided on the shorter side surface 20S of the light guide plate 20. The light sources 21 emit light from the side surface 20S toward the light guide plate 20. In this embodiment, the light guide plate 20 is provided with a plurality of light sources 21. However, the number of the light sources 21 is not limited to a specific number. In this embodiment, each of the light sources 21 is for example a light emitting diode (LED). However, the type of the light source 21 is not limited thereto.

The emitted light from the light source 21 enters the light guide plate 20 from the side surface 20S. As described above, the fine projections and depressions are formed on the surface 20B of the light guide plate 20 facing the meter unit 10. Thus, the incident light into the light guide plate 20 is mainly output toward the surface 20A, that is, toward the transparent display device 30. In this case, the meter unit 10 becomes invisible.

The control device 40 controls a display state of the transparent display device 30 and the light sources 21 of the light guide plate 20. In this embodiment, the control device 40 also controls the meter light sources 17. The control device 40 is, for example, a microcomputer unit including a central processing unit (CPU) and a memory. In this embodiment, the control device 40 can execute three types of display modes with respect to the display state of the transparent display device 30 and the light sources 21. A switch 41 for switching operation modes is connected to the control device 40. For example, a user of the on-vehicle meter 1 may operate the switch 41 so as to select the three types of display modes.

Operation Mode

Figure 3:
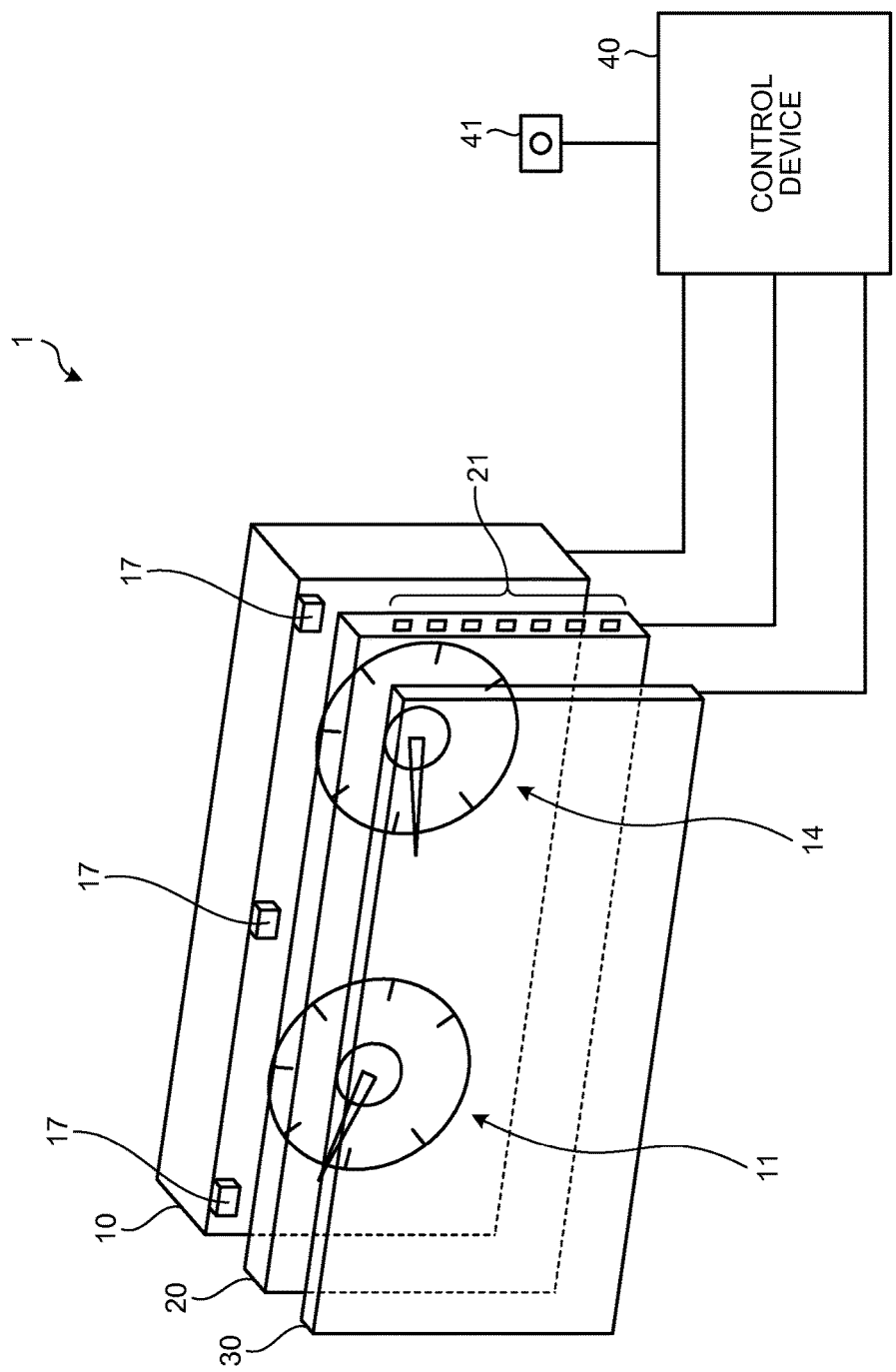
FIG. 3 is a diagram for describing a first display mode.
Figure 4:
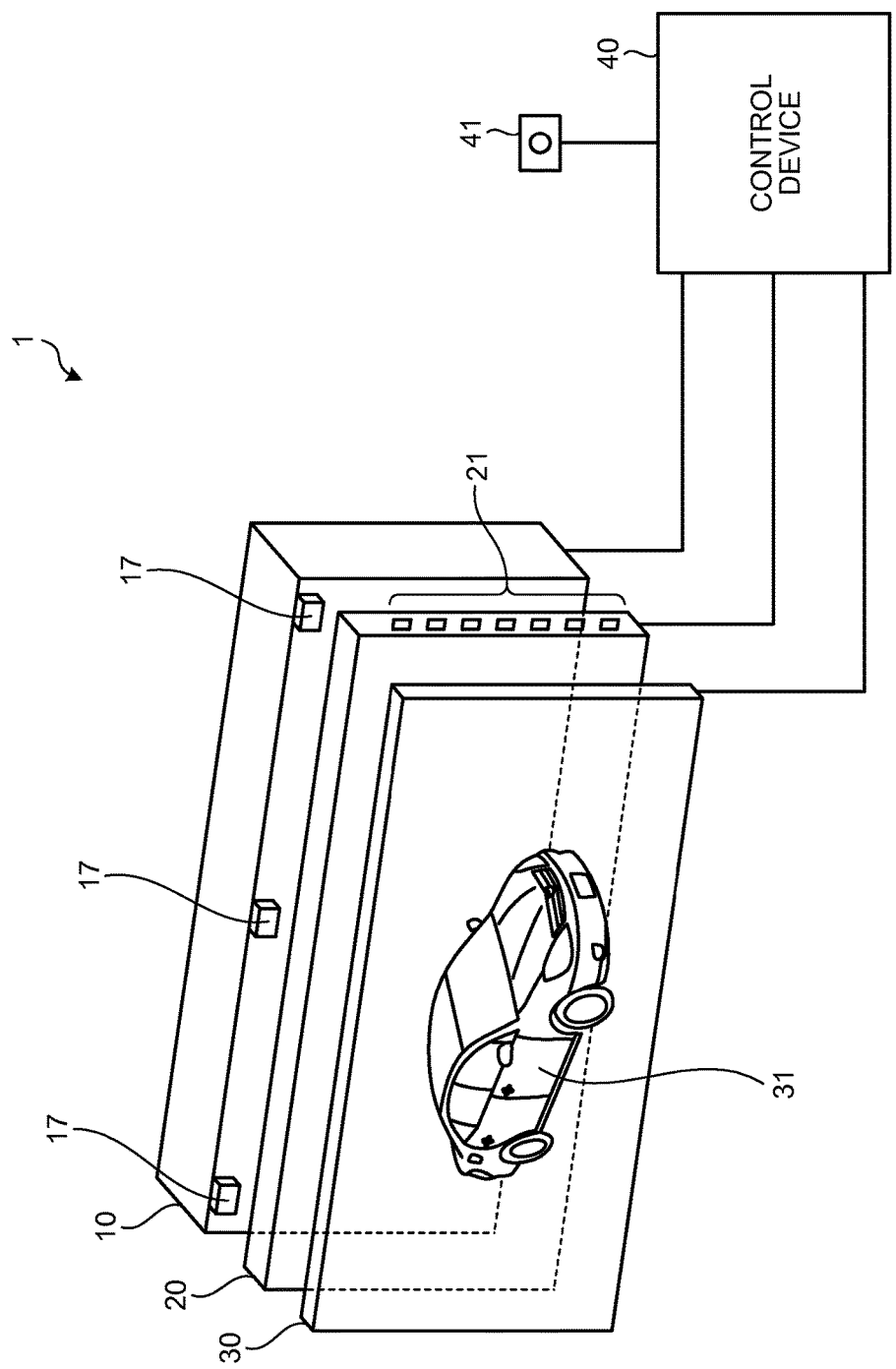
FIG. 4 is a diagram for describing a second display mode.
Figure 5:
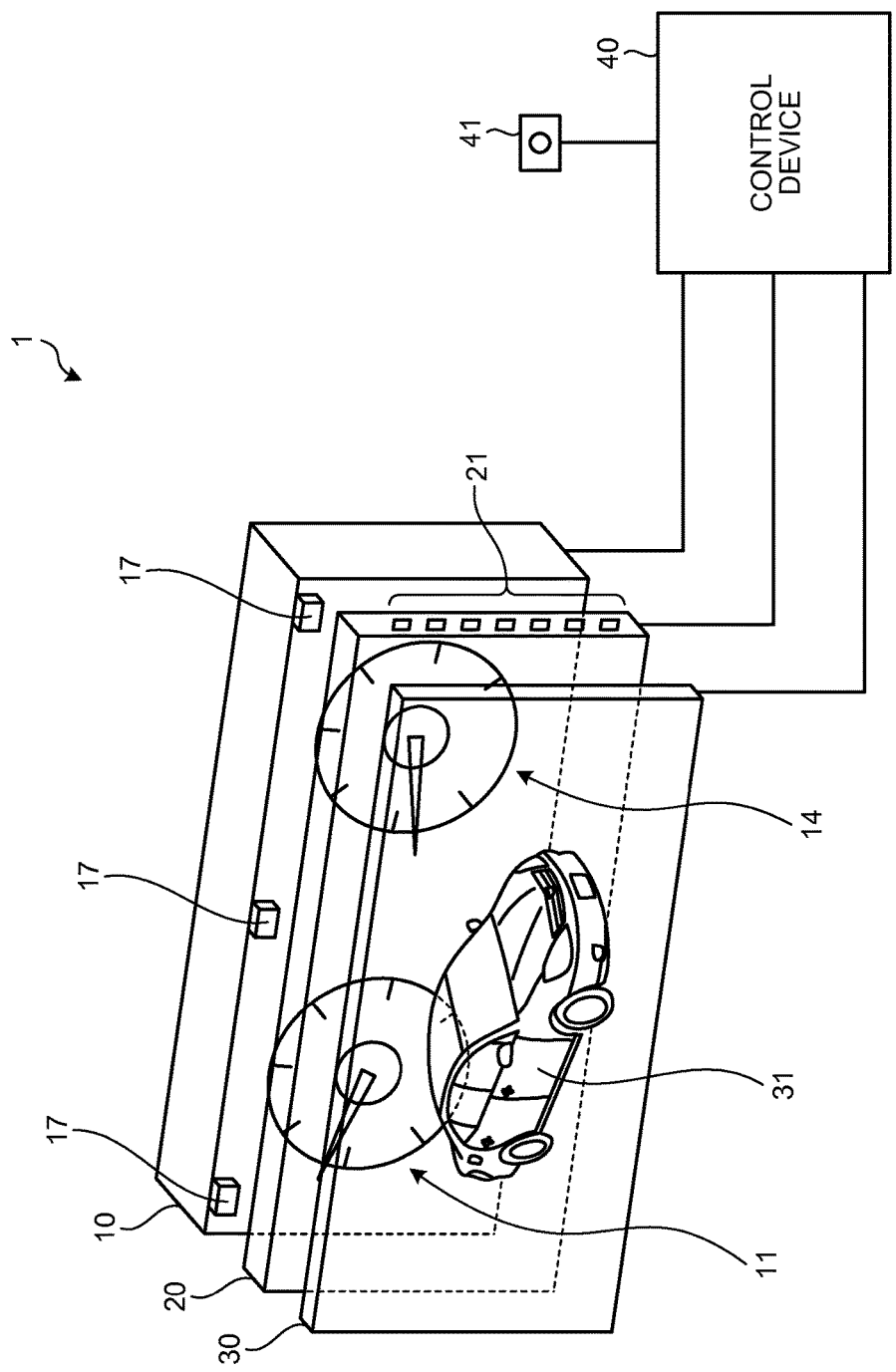
FIG. 5 is a diagram for describing a third display mode.

FIG. 3 is a diagram for describing a first display mode.
FIG. 4 is a diagram for describing a second display mode.
FIG. 5 is a diagram for describing a third display mode.

(1) First display mode: the light sources 21 of the light guide plate 20 are turned off, and the transparent display device 30 is set in a non-display state.

(2) Second display mode: the light sources 21 of the light guide plate 20 are turned on, and an image is displayed on the transparent display device 30.

(3) Third display mode: the light sources 21 of the light guide plate 20 are turned off, and an image is displayed on the transparent display device 30.

In executing the first display mode, the control device 40 turns off the light sources 21, and sets the transparent display device 30 in the non-display state, that is, a state in which no voltage is applied. In a case of a transparent display device 30 having the normally white type, in executing the first display mode, the control device 40 applies a voltage to the transparent display device 30 so as to set it in the non-display state.

In this case, both of the light guide plate 20 and the transparent display device 30 are set in a transparent state where both of them are optically transmissive, so that the user can visually recognize the first meter 11 and the second meter 14 of the meter unit 10 as illustrated in FIG. 3. In the first display mode, the control device 40 may turn on the meter light sources 17, which enhances the visibility of the first meter 11 and the second meter 14.

In executing the second display mode, the control device 40 turns on the light sources 21, and sets the transparent display device 30 in a display state. In the display state, an image 31 is displayed on the transparent display device 30 in response to an applied voltage corresponding to an image signal, as illustrated in FIG. 4. The light from the light guide plate 20 is directed toward the transparent display device 30. At least part of the light incident on the transparent display device 30 is transmitted through the transparent display device 30 depending on the display state of the transparent display device 30, and visually recognized by the user. Accordingly, the meter unit 10 becomes invisible to the user. As a result, the user can visually recognize the image 31 displayed on the transparent display device 30.

In executing the third display mode, the control device 40 turns off the light sources 21, and displays the image 31 on the transparent display device 30. And the light guide plate 20 is set in a optically transmissive state, so that the on-vehicle meter 1 can show the first meter 11 and the second meter 14 of the meter unit 10 and the image 31 displayed on the transparent display device 30 with the image 31 being overlapped with the first meter 11 and the second meter 14, as illustrated in FIG. 5. In this case, the control device 40 may turn on the meter light sources 17, by which the visibility of the first meter 11 and the second meter 14 is enhanced.

In the second display mode where the image 31 is displayed on the transparent display device 30, the meter unit 10 behind the transparent display device 30 is invisible to the user. Thus, the visibility of the image 31 of the on-vehicle meter 1 is enhanced. In a case that the image 31 is not displayed on the transparent display device 30, the on-vehicle meter 1 executes the first display mode. Accordingly, the meter unit 10 is seen through both of the light guide plate 20 and the transparent display device 30, so that the visibility of the meter unit 10 is secured. In the third display mode, both of the meter unit 10 and the image 31 can be displayed with the image 31 being overlapped with the meter unit 10, so that the user can obtain more information in addition to that obtained from the meter unit 10.

The image 31 displayed in the second display mode and the third display mode may be such an image as a navigation image. In the second display mode, the on-vehicle meter 1 may display, for example, a speedometer, a tachometer, or the like having a different aspect from the meter unit 10 as the image 31 on the transparent display device 30. In this way, the on-vehicle meter 1 can display the speedometer, the tachometer, or the like in a plurality of aspects according to the user's preference. In the third display mode, the on-vehicle meter 1 may overlap the image 31 with only one of the first meter 11 and the second meter 14 to be displayed. In this case, for example, the on-vehicle meter 1 may overlap the image 31 with one of the first meter 11 and the second meter 14 that is not assigned as the speedometer to be displayed.

First Modification

FIG. 6 is a top view illustrating an on-vehicle meter which is a display apparatus according to a first modification of the embodiment. A display apparatus 1a, that is, an on-vehicle meter 1a is different from the display apparatus 1, that is, the on-vehicle meter 1 in that a light guide plate 20a and a transparent display device 30a of the on-vehicle meter 1a are curved. More specifically, the light guide plate 20a and the transparent display device 30a are curved along the width direction W so that a distance between the central portion thereof and a meter unit 10a is smaller than a distance between respective ends thereof and the meter unit 10a. The width direction W is a direction orthogonal to a vertical direction of the light guide plate 20a and the transparent display device 30a. Since the light guide plate 20a and the transparent display device 30a are thus curved, the distances from a user of the on-vehicle meter 1a, that is, a driver M of a vehicle to the transparent display device 30a of the on-vehicle meter 1a are substantially identical, so that the visibility of the image displayed on the transparent display device 30a is further enhanced. The on-vehicle meter 1a is arranged to surround the driver M.

Second Modification

Figure 7:
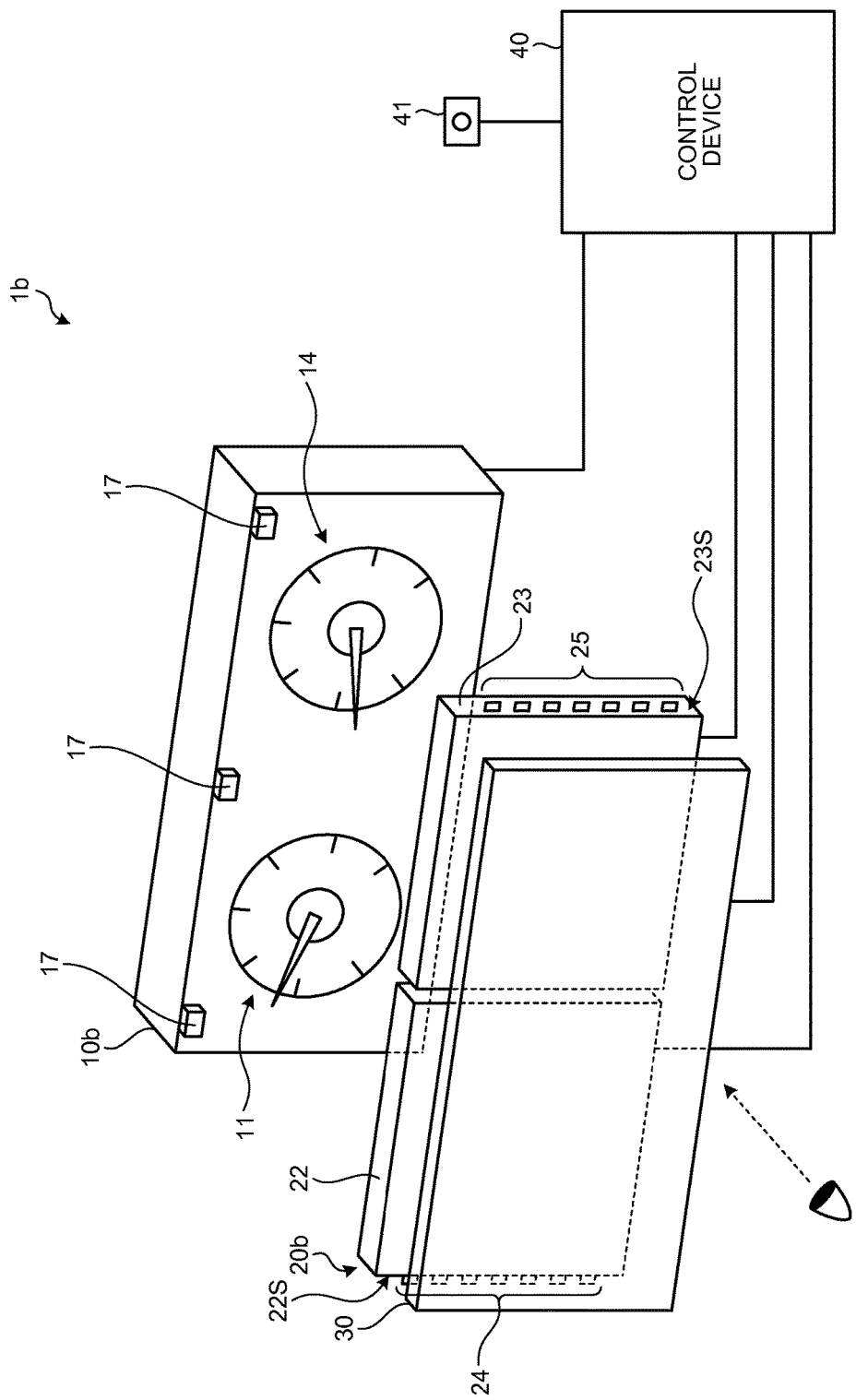
FIG. 7 is a perspective view illustrating an on-vehicle meter which is a display apparatus according to a second modification of the embodiment.

FIG. 7 is a perspective view illustrating the on-vehicle meter which is a display apparatus according to a second modification of the embodiment. A display apparatus 1b, that is, an on-vehicle meter 1b is similar to such an on-vehicle meter 1 as illustrated in FIG. 1, except that a light guide plate 20b is divided into a plurality of parts along the width direction W. Other structures are the same as those of such an on-vehicle meter 1 as illustrated in FIG. 1. The light guide plate 20b of the on-vehicle meter 1b includes a first light guide plate 22 and a second light guide plate 23. First light sources 24 are provided to a side surface 22S of the first light guide plate 22. Second light sources 25 are provided to a side surface 23S of the second light guide plate 23. Two or more first light sources 24 and second light sources 25 are provided, but the number thereof is not limited to a specific number.

The control device 40 independently controls the first light sources 24 and the second light sources 25. That is, a transmissive state or a non-transmissive state can be independently achieved for the first light guide plate 22 and the second light guide plate 23. For example, in the second display mode, the control device 40 turns on one of a group of the first light sources 24 and a group of the second light sources 25, whereas turns off the other group. In this state, the control device 40 causes an image to be displayed at a position on the transparent display device 30 facing one of the first light guide plate 22 and the second light guide plate 23 the light sources of which are turned on, and does not cause the image to be displayed at a position on the transparent display device 30 facing the light guide plate the light sources of which are not turned on. In this way, the on-vehicle meter 1b can display the image and any one of the first meter 11 and the second meter 14 at the same time.

The control device 40 may display the image on the entire transparent display device 30 in a state where one of the group of the first light sources 24 and the group of the second light sources 25 is turned on and the other group is turned off. In this way, the on-vehicle meter 1b can display the image alone at a portion where the light sources are turned on, and can overlap the image with any of the first meter 11 and the second meter 14 to be displayed at a portion where the light sources are turned off.

The first light guide plate 22 and the second light guide plate 23 serving as the light guide plate 20b and the transparent display device 30 may be curved similarly to the on-vehicle meter 1a according to the first modification.

As described above, the on-vehicle meter 1 includes the meter unit 10 having the indicators 12 and 15, each of which rotates about the certain axis, the transparent display device 30 provided on the display side of the meter unit 10, the light guide plate 20 provided between the meter unit 10 and the transparent display device 30, the light sources 21 that emit light to the light guide plate 20, and the control device 40 that controls the display state of the transparent display device 30 and the light sources 21. When the control device 40 causes the transparent display device 30 to be in a transparent state and turns off the light sources 21, the user can visually recognize the meter unit 10 through the light guide plate 20 and the transparent display device 30 for certain, so that the visibility is enhanced. A transparent self-luminous display device has a complicated structure and is difficult to be manufactured. Use of a liquid crystal display panel for the transparent display device 30, however, makes the structure relatively simple and rather facilitates the manufacture process, and thus can reduce production cost.

The control device 40 can switchingly execute the first display mode, the second display mode, and the third display mode. The first display mode is such that the light sources 21 are turned off and the transparent display device 30 is in the non-display state. The second display mode is such that the light sources 21 are turned on and the image is displayed on the transparent display device 30. The third display mode is such that the light sources 21 are turned off and the image 31 is displayed on the transparent display device 30. Selecting the first display mode enables the user to visually recognize the meter unit 10 for certain through the light guide plate 20 and the transparent display device 30. Selecting the second display mode causes the light guide plate 20 to emit light to the transparent display device 30, and thus makes the meter unit 10 hidden by the light guide plate 20. As a result, the visibility of the image 31 displayed on the transparent display device 30 is enhanced. Selecting the third display mode causes the on-vehicle meter 1 to display the image 31 and the meter unit 10 with the image 31 being overlapped with the meter unit 10.

The light guide plate 20a and the transparent display device 30a may be curved. For example, the light guide plate 20a and the transparent display device 30a may be curved along the width direction so that the distance between the central portion thereof and the meter unit 10a is smaller than the distance between respective ends thereof and the meter unit 10a. In this way, the distances from the user to any portions of the meter unit 10a can be substantially identical.

The display apparatuses 1, 1a, and 1b are assumed to be the on-vehicle meters 1, 1a, and 1b, that is, meters mounted on the vehicle. However, they are not limited to the meters mounted on the vehicle. Alternatively, each of the display apparatuses 1, 1a, and 1b may be a meter mounted on a ship or an aircraft to display information, a meter installed in a house to display an energy consumption amount in the house, or a meter installed in a plant to display various quantities of state in the plant.

The present disclosure encompasses all of the on-vehicle meters 1, 1a, and 1b, that is, the display apparatuses 1, 1a, and 1b that can be implemented by those skilled in the art by appropriately modifying designs of the meter units 10, 10a, and 10b described in the embodiment so long as they encompasses the gist of the present disclosure. Without departing from the idea of the present disclosure, various changes and corrections are conceivable by those skilled in the art, and the changes and corrections are considered to be included in the present disclosure.

For example, the present disclosure also encompasses the embodiment and the modifications thereof in which components are added, eliminated, or changed in design appropriately by those skilled in the art so long as they encompasses the gist of the present disclosure. Other operation and effect caused by the aspect described in the embodiment that are obvious from the description of the present specification or appropriately conceivable by those skilled in the art are considered to be naturally caused by the present disclosure.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An on-vehicle meter comprising:
    a meter including an indicator that rotates about a certain axis;
    a transparent display device provided on a display side of the meter;
    a first light guide plate provided between the meter and the transparent display device and opposed to a first region of the transparent display device;
    a second light guide plate provided between the meter and the transparent display device and opposed to a second region of the transparent display device that is different from the first region;
    a first light source that emits light to the first light guide plate; and
    a second light source that emits light to the second light guide plate; and
    a control device that controls a display state of the transparent display device, the first light source, and the second light source,
    wherein the control device is configured to execute
        a first display mode in which the first light source is turned on, the second light source is turned off, an image is displayed on the first region, and the second region is set in a non-display state,
        a second display mode in which the first light source is turned off, the second light source is turned on, the first region is set in the non-display state, and an image is displayed on the second region,
        a third display mode in which one of the first light source and the second light source is turned on, the other one of the first light source and the second light source is turned off, a first image is displayed on the first region, and a second image is displayed on the second region.

2. The on-vehicle meter according to claim 1, wherein the control device executes a third display mode in which the first light source and the second light source are turned off, a third image is displayed on the first region, and a fourth image is displayed on the second region.

* * * * *